July 4, 1961  L. M. H. KRAFFE DE LAUBAREDE  2,990,577
MACHINE FOR MANUFACTURING AN IMPERVIOUS
TUBE AND OTHER PRODUCTS STARTING
FROM A WOVEN TUBE
Filed Jan. 7, 1959  3 Sheets-Sheet 1

INVENTOR
L. M. H. Kraffe de Laubarede
By Holcomb, Wetherill & Brisebois
ATTORNEYS

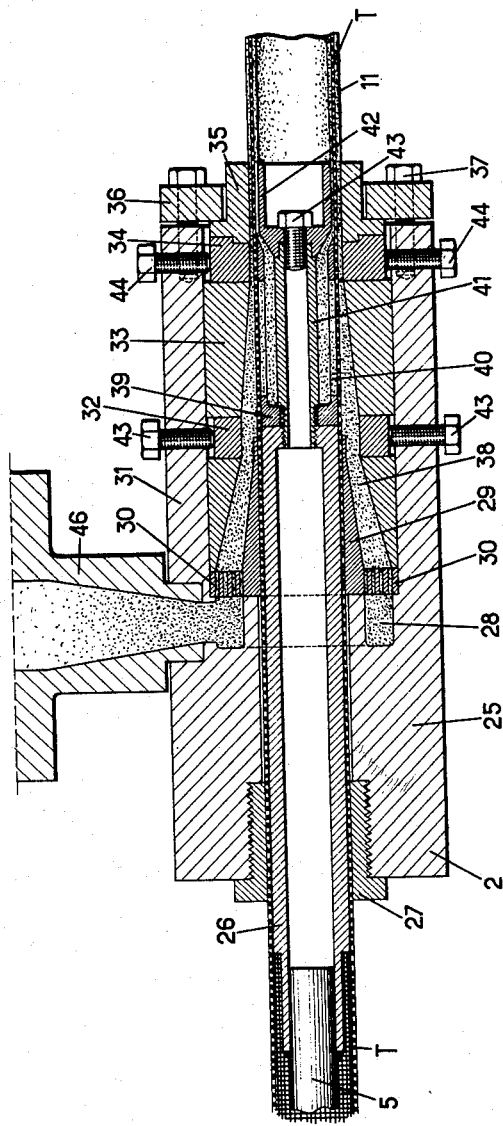

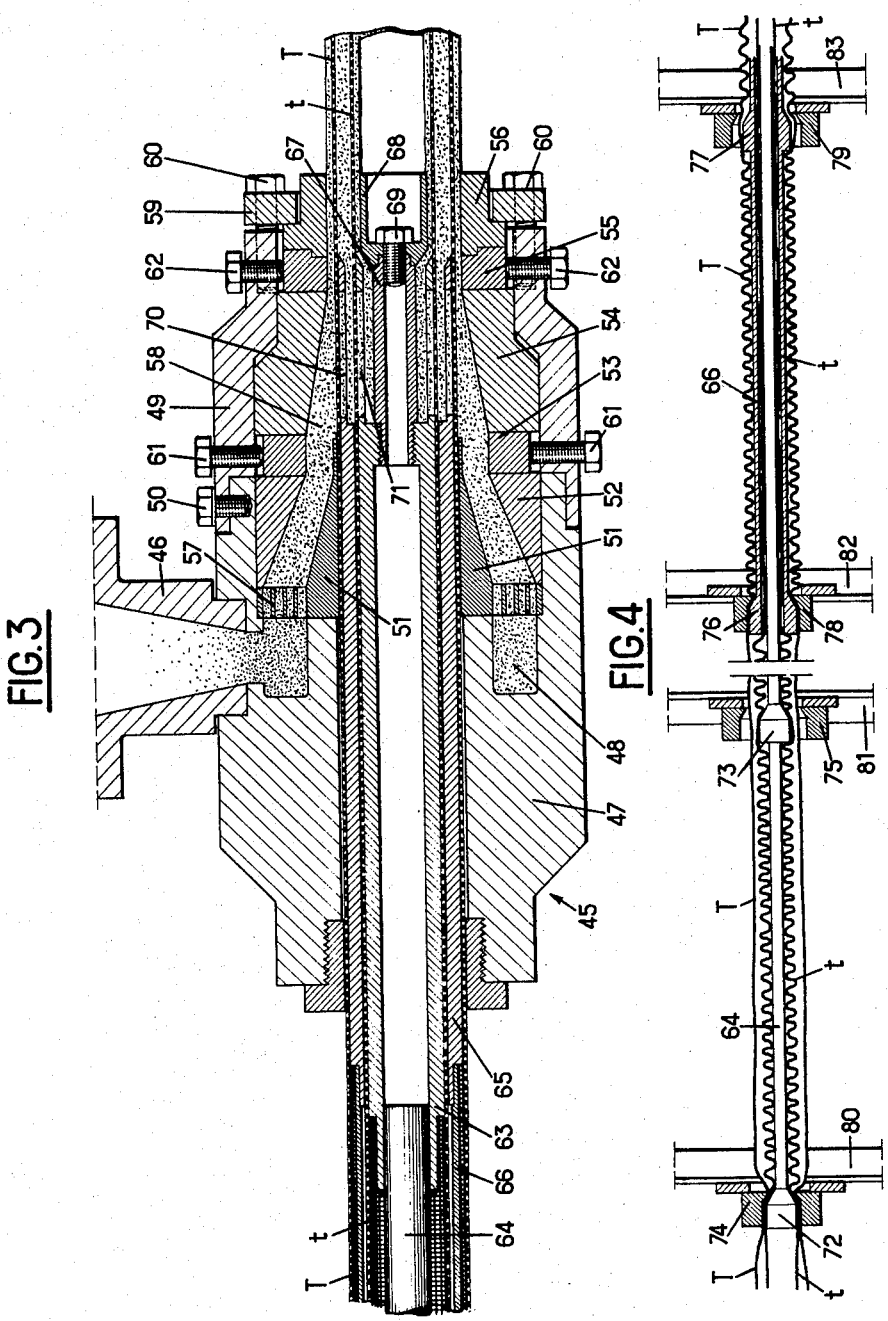

United States Patent Office 2,990,577
Patented July 4, 1961

2,990,577
MACHINE FOR MANUFACTURING AN IMPERVIOUS TUBE AND OTHER PRODUCTS STARTING FROM A WOVEN TUBE
Leonce Marie Henri Kraffe de Laubarede, 4 rue Cave, Levallois, France
Filed Jan. 7, 1959, Ser. No. 785,351
Claims priority, application France Jan. 10, 1958
8 Claims. (Cl. 18—14)

The applicant has already described, in his Patent No. 2,767,431 of September 7, 1954, entitled, "Method and Apparatus for Providing a Permeable Tube With an Impermeable Lining," a machine comprising means for moving along a woven fabric tube engaged on an internal guiding device, held in an external guiding device of the corresponding shape. The relative position of these guiding devices, the internal and the external, is held by means of rotary members which force the threads of the treated tubular mesh fabric to follow a sinuous path in this machine; the external guiding device is coupled by means of channels to an inflow duct of thermoplastic material under pressure, and this material, after traversing the fabric, passes into an axial chamber from which it is distributed to the interior of the woven tube by passing round a die, in order to be subsequently spread out (in one or more layers) on the inner surface of said tube by means of the admission of compressed air led to the interior of this die.

The aforesaid known machine produces perfectly water-tight, regular tubes in which the plastic material which ensures the imperviousness is hardly apparent on the outside of the tube obtained. However, this machine has two disadvantages; on the one hand, its output is limited owing to the fact that it is necessary to limit the speed of movement of the woven tube to which is imparted a sinuous course between said rotary members; on the other hand, the same construction of the machine makes it impossible to manufacture an impervious tube in which the plastic material is entirely embedded in such a way that the plastic material forms a double protecting layer for the fabric.

The present invention has as its object an improved machine for manufacturing a water-tight tube, comprising a tubular fabric core completely embedded in a plastic material, ensuring water or gas-tightness and at the same time protection for the core, the latter being interposed solely for the purpose of improving the mechanical resistance. The machine according to the invention makes it possible to improve the output owing to the fact that it is possible to make the woven tube move round at the maximum speed compatible with the rate of feeding of the material which ensures imperviousness of said tube, this machine moreover renders the use of compressed air superfluous; it makes it possible, furthermore, to construct tubes of precise internal and external measurements, and also sheathing of desired thicknesses.

The machine according to the invention, provided with a device for stretching the finished tube and driving it forwards, is characterized by the fact that it comprises a mandrel for cylindrical internal guidance having substantially the same section as the woven fabric tube to be treated, and an external guiding device of the corresponding shape allowing the free sliding of the woven tube, this mandrel and this external guide means having channels and zones for the passage of the plastic material which leaves by a constricted annular opening through which it is driven by the woven tube embedded in said laminated plastic material. The mandrel is held by a prolongation on which the woven tube is engaged and held before the latter penetrates into the machine, this prolongation being itself held in an adjustable fixed position by two clamping devices sufficiently remote from each other and which can be tightened alternately in order that a reserve of woven tube may be held constantly at the entry of the machine, while leaving the mandrel in a fixed position.

The machine for manufacturing impervious tubes, according to the invention, may furthermore comprise accessory devices for example a device for cooling the tube obtained, a device for regulating the speed at which this tube is driven, etc. This machine is suitable for the manufacture of belts by simply collapsing the tube formed in a convenient and self-sealing rolling device at a convenient temperature suitable for joining the two halves of the interior plastic sheath; one can also, in the same manner, manufacture bands suitable for floor lining.

The invention consequently also has as its object all industrial products which can be obtained with the machine according to the invention; tubes of plastic material reinforced by tubes of woven material, belts, or analogous products.

Without modifying the essential characteristics of the machine according to the invention, one may also construct it for the purpose of impregnation not only of a single woven tube, but of two or more coaxial woven tubes, by providing additional intermediate guide members between the internal mandrel carrying the internal woven tube and having a thinner section, and the external guide member in which the external tube passes, having a larger section.

There will now be described, by way of a non-limiting example, a machine according to this invention. The description is with reference to the attached drawings, in which:

FIGURE 2 is a sectional detail along the line II—II of FIGURE 1, but to a larger scale, to show the detail of the head of the machine, this head comprising a guide means for the woven tube and channels to make plastic material in which this tube is to be immersed circulate.

FIGURE 3 is a partial section analogous to that of FIGURE 2, but relating to the head of a machine designed to guide reinforcement consisting of two concentric woven tubes which are embedded in plastic material.

FIGURE 4 is a diagrammatic view showing the arrangement of the bars which hold the mandrels at the head of a machine analogous to that shown in FIGURE 3.

Figure 1:
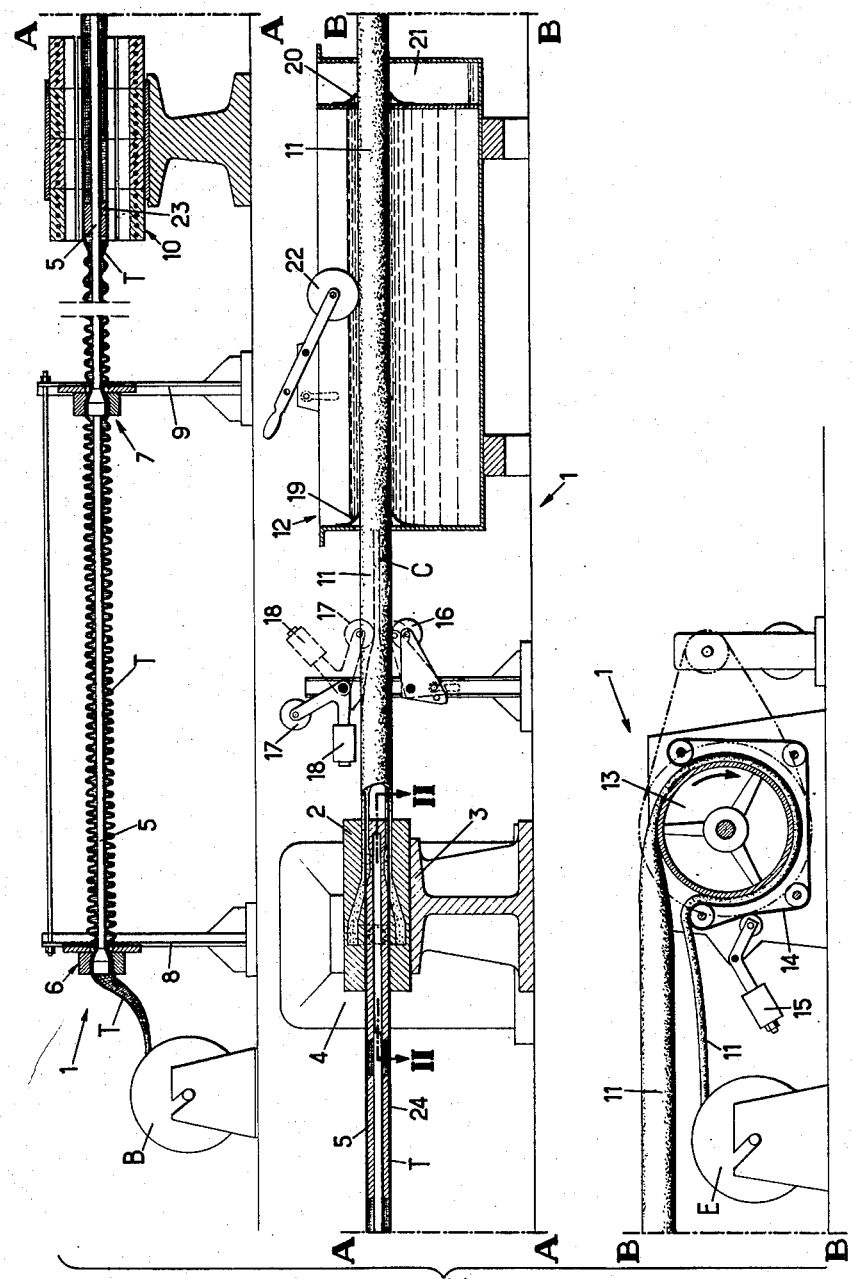
FIGURE 1 is a side view partly in vertical section, through the axis, of the assembly of the machine according to the invention, this view having a part broken away and three parts which are joined at AA and BB respectively.

The machine 1 shown in FIGURE 1 is designed to manufacture impervious tube from a woven tube T stored on a bobbin B mounted in such a way as to allow the tube to be unwound freely.

The machine 1 comprises a head 2 carried by a support 3. This head 2 is connected to a source of plastic material under pressure, which source may consist of an extrusion machine 4 of known type. The head 2, which will later be described in detail with reference to FIGURE 2, comprises a guiding mandrel on which the tube T is slipped; this guiding mandrel has an extension which is a cylindrical bar 5, which is preferably tubular, and to which the head 2 is connected by any suitable means.

On entering the machine 1, the woven tube T is supported by this bar 5, on which it is slipped, and held, at the same time as the bar, by two clamping members 6 and 7 rigidly connected to fixed supports 8 and 9. These clamping members 6 and 7 consist of jaws or clamps of known type, and for example of two jaws pivoted on a corresponding horizontal axis, and capable of being tightened against each other by means of screws, bolts, or any other kind of tightening means which may be hand-operated, semi-automatic, or automatic.

The reference number 10 indicates a drying device operated by any convenient means (electrical resistances, infra-red lamps, hot air circulation, etc.) and designed to dry the tube T before it enters the head 2, where this tube is embedded in plastic material.

At the exit from the head 2, the tube T embedded in plastic material consists of a flexible impervious tube 11 which is made to pass into a cooling chamber 12 where it is cooled by circulating a liquid (most frequently water) in order to impart to the plastic a desirable consistency before flattening the tube 11 and rolling it onto a bobbin as a finished product.

The flattening of the tube 11 takes place on a winding drum which draws along the tube 11 and consequently also the tube T entering the head 2. A belt 14 with an automatic tensioner 15 makes the tube 11 adhere to the drum 13 and the latter is driven by any convenient motor preferably including a speed regulating device. The finished tube 11 is rolled onto a bobbin E by any suitable means.

As shown in FIGURE 1, the tube T is corrugated on the bar 5 on both sides of the clamping mechanism 7. This arrangement, which characterizes the functioning of the machine according to the invention, makes continuous operation possible. When the drum 13 turns continuously, the portion of the corrugated tube T situated between the clamping device 7 and the drying device 10 stretches progressively, because the tube T is moved by the traction exerted on it by the impervious tube 11 formed. For this reason, it is convenient to seek to maintain a portion of the corrugated tube between the clamping device 7 and the drying device 10; for this purpose, it is sufficient to unclamp the device 7 while advancing the portion of corrugated tube between the two clamping devices 6 and 7 until that portion is stretched. The device 7 is then clamped again, and the device 6 is unclamped, and a reserve of corrugated tube is advanced onto the bar 5 between the supports 8 and 9. The device 6 is then clamped again. Consequently, at least one of the devices 6 or 7 is clamped and in this way the guiding mandrel is retained motionless in the head 2, since the mandrel is rigidly connected to the bar 5.

The machine 1 is equally suitable for the manufacture of belts or similar flat elements as it is for the manufacture of impervious tubes. For this purpose, two roller guides, a lower 16, and an upper 17 are provided, which can be placed in the position shown in broken lines to flatten the tube T in the position also shown in broken lines and designated by C. It suffices that the pressure exerted by the counter-weights 18 is sufficient to produce autogenous welding together of the upper and lower halves of the interior wall of the tube 11.

It is seen in FIGURE 1 that the sealing of the chamber 12, at the entry and exit of the tube 11, is obtained by elastic flanges 19 and 20, made for example of rubber. It must be noted that it is necessary to modify the shape of the flanges when manufacturing a belt C. In either case, the cooling liquid which may escape from the chamber 12 at the exit of the manufactured product is collected in a gutter 21. The tube 11, or the belt C, are held immersed in the cooling liquid of the chamber 12 at a convenient level by a roller 22 of which the support may take up two convenient positions according to the product made. FIGURE 1 also shows that the bar 5 carries, at the entry to the drying device 10, a sleeve 23 and, in front of the entrance to the head 2, a sleeve 24. These sleeves 23 and 24, which have an external diameter substantially equal to the internal diameter of the tube T, serve to hold the tube, in order to facilitate its drying, and its placing in the correct position at the entrance of the head 2 of the machine 1.

Referring to FIGURE 2, it is seen that the head 2 comprises a main body 25 joined by any known means to an inlet pipe 46 for the plastic material under pressure which is to enclose a tube T completely, like reinforcement, to transform the latter into an impervious tube 11.

The body 25 is bored out to allow free passage of the tube T and of a cylindrical mandrel 26, fixed to the exterior of the bar 5 for example by welding. The tube T can slide with slight friction on the mandrel 26, which has a corresponding diameter, and is inside a drilled and threaded sleeve 27 situated at the entrance to the head 2. The orifice of the pipe 46 opens into a bore in the body 25, in which there is an annular chamber 28. This chamber 28 is partly closed by a turned piece 29 which is inserted in the bore in the member 25, and which comprises a collar pierced with orifices 30 allowing the passage of the plastic material led through the pipe 46. The piece 29 is held within a shaped throat formed by a series of turned rings of appropriate shapes 31, 32, 33, 34, 35, clamped by a collar 36, which is itself fixed to the member 25 by bolts 37. There is thus produced, below the orifices 30, a chamber 38 of which the cross-section progressively decreases. The plastic material which is held under pressure can penetrate into this chamber. The chamber 38 extends past a piece 39 which is in the form of a cylindrical lantern ring with windows 40. The lantern ring is fixed to the front end of the mandrel 26 by a tube 41 screwed onto the mandrel. This tube 41 has a screw threaded front end on which a die 42 is fixed by means of a bolt 43. The die 42, in the form of a truncated cone and cylinder constitutes an internal support for the formed tube 11 of which it regulates the internal diameter, the plastic material being in some way extruded between this die 42 and the rim of the bore of the ring 35 at the same time as the material is moved by the reinforcement T which is under the traction exerted on the cooled and finished tube 11 which is wound at a controlled speed.

It is suitable to remark that one can adjust the centering of the ring 32 by means of bolts 43, whereas the centering of the rings 34 and 35, connected by a shoulder, may be effected by means of bolts 44. These two adjustments make it possible to perfect the uniformity of the thickness of the outside as well as of the inside of the plastic sheath along the whole circumference of the finished tube. The path of the plastic material in the head 2 is clear from the description above; the material arrives by the pipe 46, passes through the orifices 30 into the chamber 38, from there it surrounds the tube T, which it can penetrate by passing through the windows 40 of the lantern 39, this material leaving, together with the tube T embedded in it, between the die 42 and the ring 35.

The head 45 of the machine shown in FIGURE 3 forms part of a machine designed to manufacture an impervious tube comprising two concentric simultaneously woven tubes of reinforcement.

The head 45 comprises a body member 47 having a recess forming an annular chamber 48 communicating with the inlet pipe 46 for the plastic material under pressure. This pipe 46 is fixed to the body 47 by any convenient means, which it was not considered necessary to show.

The recess of the member 47 is closed by a cap 49 fixed by means of bolts 50, this cap holding a certain number of elements 51—52—53—54—55—56, in the form of rings. The member 51 has a collar pierced by orifices 57 through which the plastic material passes from the chamber 48 into an annular passage 58 held between the elements 51 and 52. A flange 59 fixed to the cap 49 by bolts 60 ensures the holding in place of the elements 51 to 56, inside the head 45. The centering of the ring 53 can be adjusted by means of bolts 61, while the centering of the rings 55 and 56, which are rigidly connected by a shoulder, may be obtained by means of the bolts 62.

The references T and t indicate an inner and an outer woven tube, which are concentric with one another and are placed in the head 45 in order to be embedded in a plastic material to manufacture an impervious reinforced tube. The internal tube t is placed on a tubular mandrel 63 rigidly connected to a bar 64, whereas the tube T is placed on a mandrel 65 rigidly connected to a bar 66.

The mandrel 63 carries at its free end a screwed-in tubular bracing-tube 67, which in turn carries a die 68 fixed to it by a bolt 69. The mandrels 65 and 63 respectively form at their cylindrical ends annular lattices or lantern rings 70 and 71, which have the same external diameter as the mandrels and which have orifices for the penetration of plastic material through the fabric of the tubes T and t; the tubes T and t leave, embedded in the plastic material used, which is extruded between the die 68 and the ring 56. The impervious tube with a double reinforcement of fabric, thus formed, may if desired be collapsed at a suitable temperature in order to obtain by an autogenous welding of the plastic material, a flat element which can be used as a belt or as a floor lining band.

The device for fixing the tubular bars 64 and 66 which retain the mandrels 63 and 65 in a fixed longitudinal position, inside the head 45 (FIG. 3), will now be described, with reference to FIGURE 4.

The bar 64, on which the tube t is placed projects beyond the bar 66 on which is engaged the tube T which has the greatest diameter; the portion of the bar 64 which thus projects beyond the bar 66 must be sufficiently long, because this portion must carry a sufficient length of the tube t. The tube t is corrugated in such a way as to allow, as will be seen, a continuous operation of the machine. The bar 64 carries two sleeves 72 and 73 capable of co-operating with the clamping devices 74 and 75, of which one at least is always clamped onto the tubes T and t.

The end of the bar 66, also has two sleeves 76 and 77 which can co-operate with two clamping devices 78 and 79, of which one at least is always clamped onto the tube T. In order to permit a continuous operation of the machine, a sufficient length of this tube T must be supported on the bar 66 whilst forming corrugations beginning from the sleeve 76 to just beyond the sleeve 77.

The clamping devices 74, 75, 78 and 79 are mounted on the supports 80, 81, 82 and 83.

When the machine provided with the head 45 is in operation, in the position shown in FIGURE 4, the devices 74 and 78 are in the clamping position and the devices 75 and 79 are loose.

The tubes t and T are stretched when they leave the head 45 and advance at a speed controlled in dependence on the plastic material used and the rate at which it must be supplied in order to surround the woven reinforcement in the exact conditions desired. As a result, the corrugated parts of the tubes t and T, which constitute the reserves, diminish progressively in amount. When it is judged that these reserves must be renewed, then, after having pushed the corrugated parts beyond the sleeves 73 and 77 respectively by any convenient means, one loosens the devices 74 and 78, and brings about, by any convenient means, the advancement of the tubes t and T in order to renew the reserves of corrugated tubes t and T on the upstream side of the devices 75 and 79. One then reclamps the devices 75 and 79 in order to re-establish the previous operative position (FIG. 4).

It is understood that the forms of construction described by means of examples are not to constitute any limitation of the different possibilities of putting the invention into operation. One may apply to these constructions modifications, improvements and additions without modifying the essential characteristics of the invention. It is in particular within the scope of the operator to construct devices for intermittent automatic or semi-automatic drive, to make the woven tubes advance towards the head in which these tubes are immersed in a plastic material.

The machine according to the invention also allows the manufacture of rigid tight tubes by using a suitable driving means.

What I claim is:

1. An extrusion machine for the continuous production of an impervious tube having a pervious reinforcing sleeve embedded in a thermoplastic material, comprising an extrusion head having a longitudinal bore, a bar coaxial to said bore and adapted to be enveloped by said reinforcing sleeve, external means at the rear of said extrusion head for supporting said bar, a mandrel mounted within said bore and carried by said bar with a clearance between said mandrel and said bore for the reception of said sleeve, a die in the front of said bore with a clearance between said die and said bore for the reception of said sleeve, axially extending means connecting said die to the front of said mandrel, and an axially extending open space between the peripheral portions of the adjacent ends of the mandrel and the die, means for moving said sleeve through the clearances in said extrusion head and over said open space, and means for supplying said thermoplastic material under pressure to said extrusion head exteriorly of said sleeve whereby some of said thermoplastic material is forced through said sleeve into said open space to contact and coat the inner surface of said sleeve, while the remainder coats its outer surface, thus embedding said reinforcing sleeve in said plastic material as it is moved forward.

2. An extrusion means as claimed in claim 1 in which at least part of said open space is encircled by an annular lattice which serves as a support for said sleeve and through which said thermoplastic material penetrates to said open space.

3. An extrusion machine for the continuous production of an impervious tube having a pervious reinforcing sleeve embedded in the thermoplastic material, comprising an extrusion head having a longitudinal bore, a bar coaxial to said bore and adapted to be enveloped by said reinforcing sleeve, a pair of axially spaced independently releasable clamping means at the rear of said extrusion head for holding said bar, a mandrel mounted within said bore and carried by said bar with a clearance between said mandrel and said bore for the reception of said sleeve, a die in the front end of said bore with a clearance between said die and said bore for the reception of said sleeve, axially extending means connecting said die to the front of said mandrel, and an axially extending open space between the peripheral portions of the adjacent ends of the mandrel and the die, means for moving said sleeve through said extrusion head and clearances, and means for supplying said thermoplastic material under pressure to said extrusion head exteriorly of said sleeve whereby some of said thermoplastic material is forced through said sleeve into said open space to contact and coat the inner surface of said sleeve, while the remainder coats its outer surface, thus embedding said sleeve in said plastic material as said sleeve is moved forward.

4. An extrusion machine for the continuous production of an impervious tube having two coaxial pervious reinforcing sleeves embedded in a thermoplastic material, comprising an extrusion head having a longitudinal bore, a first bar coaxial to said bore and adapted to be enveloped by the innermost of said reinforcing sleeves, a mandrel for slidably carrying said innermost sleeve, said mandrel being mounted within said bore and connected to said bar, a die and means connecting said die to the front of said mandrel and defining with said die and mandrel an open space which extends axially between the peripheral portions of the adjacent ends of said mandrel and said die, first external supporting means for said first bar at the rear of said extrusion head, a tubular bar coaxial to said bore, positioned to envelop with clearance said innermost sleeve and permit slipping of said sleeve therewithin and to slidably receive on its external surface the outermost of said reinforcing sleeves, said die defining with said bore an annular clearance space for reception of said sleeves, second external supporting means for said tubular bar between the rear of said extrusion head and said first external supporting means for said bar, means for pulling said reinforcing sleeves through the clearances in said extrusion head and over said open space, and means for supplying said thermoplastic material under pressure to the longitudinal bore of said extrusion head exteriorly of said sleeves whereby some of said thermoplastic material is forced through said sleeves into said open space to contact and coat the inner surface of said innermost sleeve and said reinforcing sleeves are embedded in said thermoplastic material as they are pulled forward.

6. An extrusion machine as claimed in claim 1, in which part of said open space is encircled by an annular lattice axially spaced from said die, said lattice serving as a support for said sleeve and permitting said plastic material to penetrate therethrough into said open space.

7. An extrusion machine as claimed in claim 6, in which said bore tapers inwardly from its rear end toward its front end.

8. In combination, an extrusion head for use in the continuous production of an impervious tube having a pervious sleeve embedded in a thermoplastic material, said head having a longitudinal bore, a bar coaxial to said bore and adapted to be enveloped by said reinforcing sleeve, external means at the rear of said head for supporting said bar, a mandrel mounted within said bore and carried by said bar with a clearance between said mandrel and bore for the reception of said sleeve, a die in the front of said bore with a clearance between said die and bore for the reception of said sleeve, axially extending means connecting said die to the front of the mandrel, and an axially extending open space between the peripheral portions of the adjacent ends of said mandrel and die, said clearances permitting said sleeve to be fed therethrough and around said open space, and said extrusion head being provided with means for admitting thermoplastic material to the periphery of said bore, whence some of said material can be forced through said sleeve into said open space to coat the inner surface of said sleeve, while the remainder forms an outer coating therefor, so that said sleeve is embedded in said plastic material.

References Cited in the file of this patent

UNITED STATES PATENTS

| | | |
|---|---|---|
| 1,746,821 | Davis | Feb. 11, 1930 |
| 1,974,285 | Maclachlan | Sept. 18, 1934 |
| 2,767,431 | De Laubarede | Oct. 23, 1956 |
| 2,874,411 | Berguist | Feb. 24, 1959 |